United States Patent [19]
Damson et al.

[11] Patent Number: 6,135,810
[45] Date of Patent: Oct. 24, 2000

[54] TERMINAL AND KEYBOARD ASSEMBLY WITH INTEGRAL STORAGE

[75] Inventors: Mike H. Damson, Lynnwood; Peter Wung, Redmond; Ben Macomber, Shoreline, all of Wash.

[73] Assignee: Intermec IP Corp., Beverly Hills, Calif.

[21] Appl. No.: 09/335,626

[22] Filed: Jun. 18, 1999

[51] Int. Cl.$^7$ .................................................. H01R 13/72
[52] U.S. Cl. .......................................................... 439/501
[58] Field of Search ............................ 439/501; 174/50; 361/643; 248/65; 340/407.2

[56] References Cited

U.S. PATENT DOCUMENTS

| | | | |
|---|---|---|---|
| 4,067,526 | 1/1978 | Storer | 439/501 |
| 4,488,146 | 12/1984 | Burchart | 340/407 |
| 4,799,251 | 1/1989 | Smith et al. | 439/501 |
| 5,113,349 | 5/1992 | Nakamura et al. | 364/478 |
| 5,189,256 | 2/1993 | Epple | 439/501 |
| 5,457,600 | 10/1995 | Campbell et al. | 439/501 |
| 5,773,757 | 6/1998 | Kenney et al. | 439/501 |
| 5,924,892 | 7/1999 | Ferracina | 439/501 |

*Primary Examiner*—Khiem Nguyen
*Assistant Examiner*—Son V. Nguyen
*Attorney, Agent, or Firm*—Perkins Coie LLP

[57] ABSTRACT

A vehicle mounted terminal and keyboard assembly for use on a vehicle. The assembly includes a terminal mountable to a vehicle, an elongated cable having first and second cable portions, the first cable portion being connected to the terminal and keyboard assembly mountable to the vehicle and connected to the second cable portion. A keyboard assembly has a housing with a cable storage recess therein size to removably receive and retain the second cable portion with the first cable portion being exterior of the housing. The recess has a first length and the second cable portion has a second length longer than the first length. The cable is positioned with the first cable portion extending through the recess and to the terminal. A cable retaining member is connected to the housing and positioned to retain the first portion of the cable within the recess.

26 Claims, 3 Drawing Sheets

TERMINAL AND KEYBOARD ASSEMBLY WITH INTEGRAL STORAGE

TECHNICAL FIELD

The present invention is directed towards computer assemblies, and more particularly toward terminal and keyboard assemblies.

BACKGROUND OF THE INVENTION

Computer assemblies mounted on vehicles typically include a terminal mounted so it is visible by an operator of the vehicle, and a keyboard positioned for easy access by the operator. One style of vehicle mounted terminals have keyboards integrally connected to the terminal. The terminal and integral keyboard can provide a compact assembly, but such assembly may not be suitable for all vehicles or conditions, such as when the mounting or operating conditions are better suited for the keyboard being remotely located from the terminal.

In the assemblies with the keyboard remote from the terminal, the components are operatively connected to each other by an external cable. Depending upon where or how the keyboard is mounted on the vehicle, the connecting cable may need to be long or short. After the terminal and keyboard are installed on the vehicle, any excess cable must be secured in an out-of-the-way location to avoid interfering with operation of the vehicle. Different vehicles have different mounting locations for the terminal and keyboard, thereby requiring different cable lengths so as to avoid excess cable between the terminal and the keyboard. Maintaining an inventory of cables having different lengths to accommodate different mounting configurations for different vehicles can be costly and cumbersome.

In one prior art embodiment, a cable reel is provided with the terminal and keyboard configuration to take up excess cable. Cable reels, however, are bulky, expensive, and may be subject to failure. If the cable reel breaks or must be replaced, the terminal and keyboard may need to be taken out of service until the repair or replacement can be completed. Taking equipment out of service is an inefficient use of equipment and manpower.

SUMMARY OF THE INVENTION

The present invention corrects deficiencies experienced in the prior art, and provides other benefits. One embodiment of the invention provides a keyboard assembly coupleable to a terminal. The assembly includes a cable having elongated first and second cable portions, with the first cable portion being coupleable to the terminal, and the second cable portion connected to the keyboard housing. The housing has a cable-storage recess therein sized to receive and retain the elongated second cable portion therein. The second cable portion has a length greater than the length of the recess, so the recess is sized to retain the second cable portion in a bent or coiled configuration. The cable is positionable with the second cable portion in the recess and the first cable portion extending from the recess to the terminal. A cable retaining member, such as a plate or the like, is connected to the housing and positioned to removably retain the second cable portion in the recess.

DETAILED DESCRIPTION OF THE INVENTION

A terminal and keyboard assembly in accordance with the invention is described in detail herein. In the following description, numerous specific details are provided to provide a thorough understanding of embodiments of the invention. One skilled in the relevant art, however, will recognize that the invention can be practiced without one or more of the specific details. In other instances, well-known structures or operations are not shown or not described in detail to avoid obscuring aspects of the invention.

Figure 1:
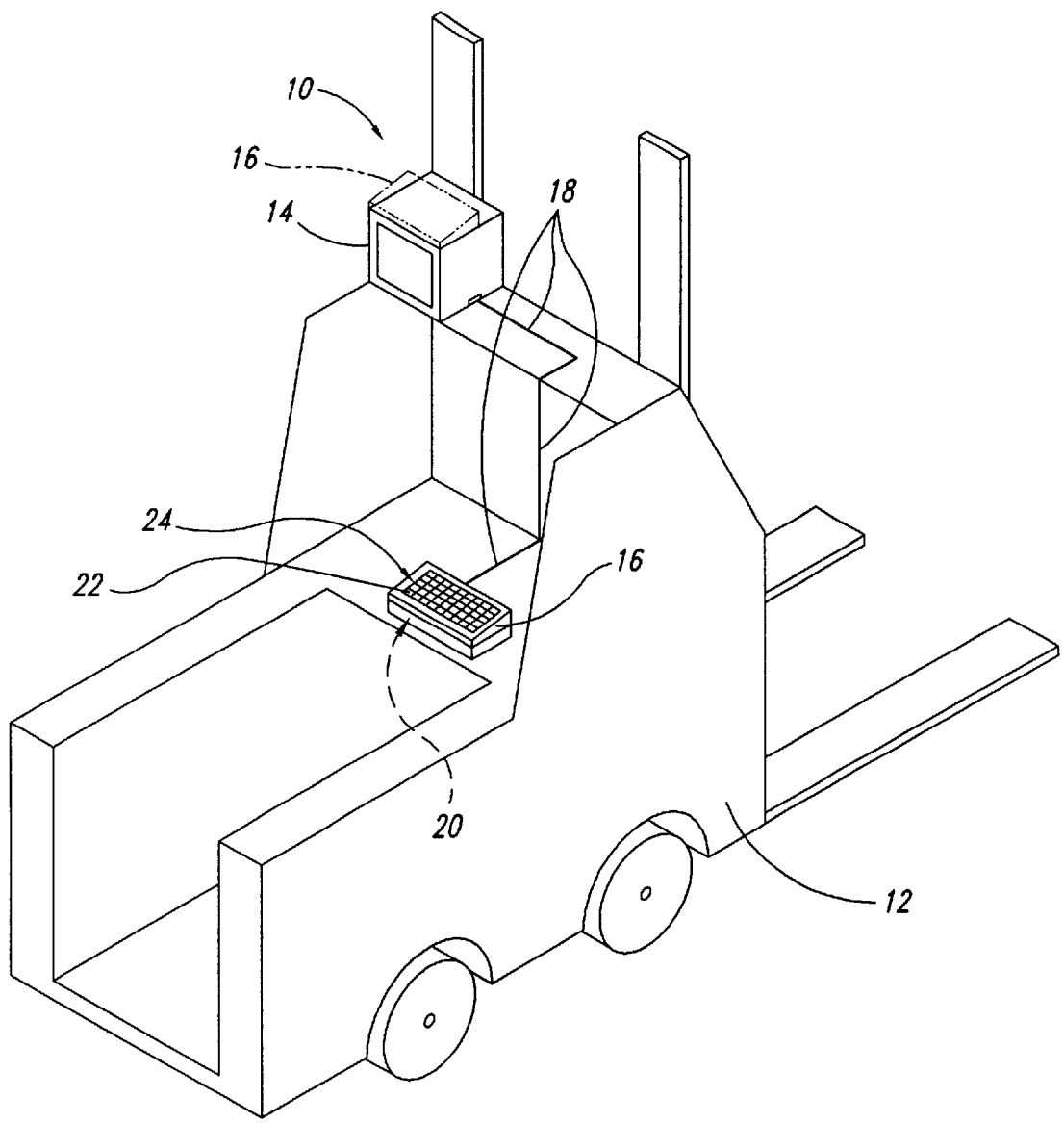
FIG. 1 is a schematic isometric view of a terminal and keyboard assembly mounted on a vehicle in accordance with an embodiment of the invention, the keyboard being shown in solid lines mounted remotely from the terminal, and being shown in phantom lines mounted to the terminal.

A terminal and keyboard assembly 10 mountable to a vehicle 12 in accordance with one embodiment of the present invention is shown in the figures for illustrative purposes. As best seen in FIG. 1, the terminal and keyboard assembly 10 includes a terminal 14 mounted to the vehicle 12, shown as a fork lift. A keyboard assembly 16 is shown in solid lines mounted to the vehicle 12 and is in a position remote from the terminal 14. The keyboard assembly 16 is operatively connected to the terminal 14 by an elongated cable 18. The keyboard assembly 16 includes a plurality of input keys 22 on a keypad 24 in a position easily accessible by the vehicle operator. The keyboard assembly 16 also has an integral cable storage recess 20 shaped and sized to contain a portion of the cable 18 therein.

The cable storage recess 20 allows any excess cable to be stored, so a minimum length of cable 18 can be used to extend between the keyboard assembly 16 and the terminal 14. Minimizing the amount of cable 18 extending between the keyboard assembly 16 and the terminal 14 allows the cable 18 to be easily routed between components without having to accommodate extra cable therebetween. The exterior portion 40 of the cable 18 extending from the keyboard assembly 16 can also be secured to the vehicle by conventional tie downs or the like, so as to stay out of the way of the vehicle operator. The keyboard assembly 16 having the cable storage recess 20 also allows the same assembly to be used on vehicles having different mounting locations for keyboards and terminals. This avoids having to maintain an inventory of different parts to accommodate different vehicle configurations. This keyboard with integral cable storage recess 20 also allows the location of the keyboard assembly 16 on the vehicle 12 to be changed, if needed, and the length of the cable exterior of the keyboard assembly can easily be adjusted into or out of the cable storage recess 20.

As shown in phantom lines in FIG. 1, the keyboard assembly 16 can be mounted directly onto the terminal 14, rather than remote from the terminal 50. In this configuration, the length of cable 18 needed to connect the keyboard assembly 16 to the terminal 14 is substantially shorter than when the keyboard is remotely mounted, so more of the cable is retained in the cable storage recess 20.

Figure 2:
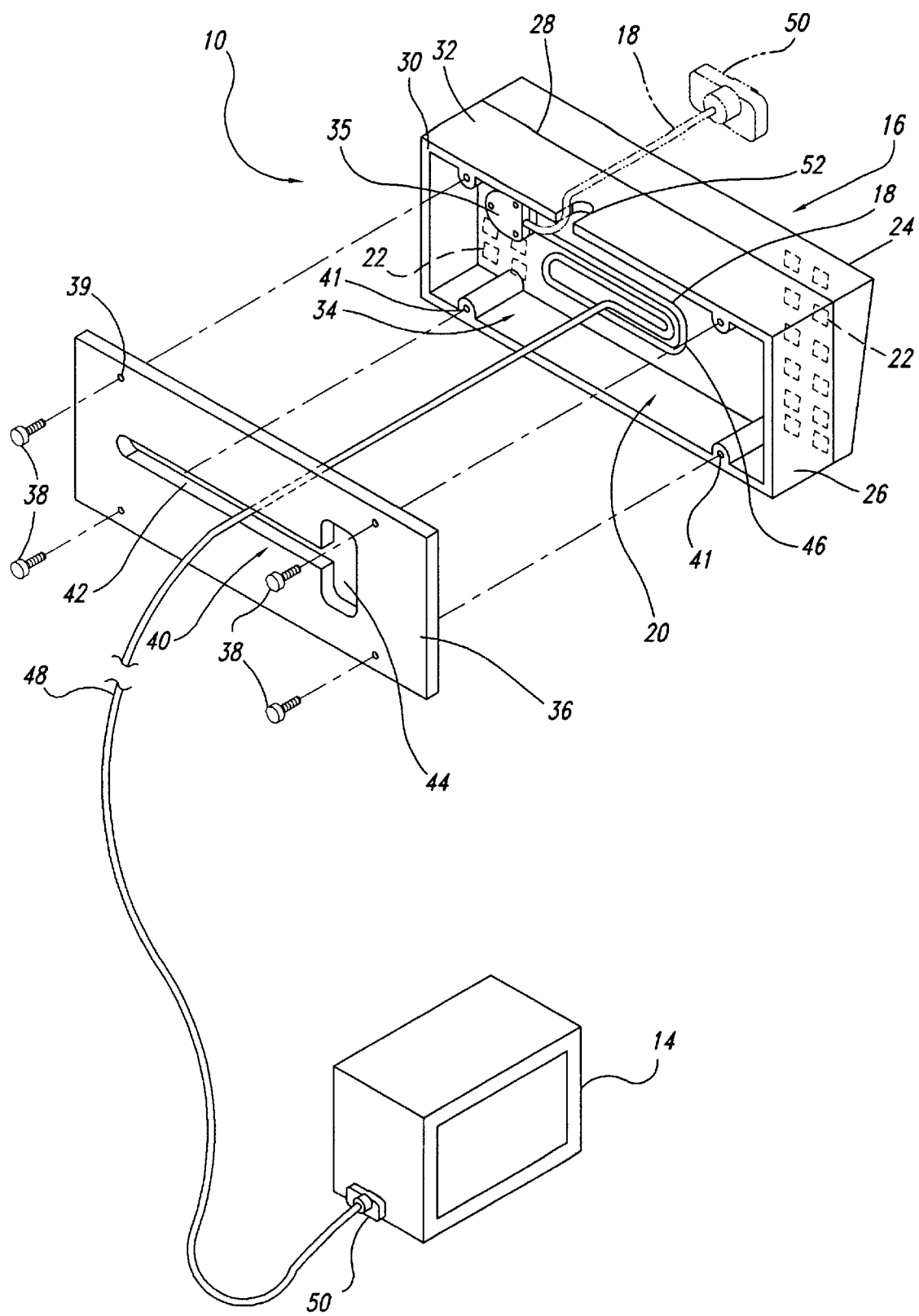
FIG. 2 is an enlarged bottom isometric view of the terminal and keyboard assembly of FIG. 1.

As best seen in FIG. 2, the keyboard assembly 16 includes a housing 26, and the keypad 24 is mounted to a top side 28 of the housing. The housing 26 also has a bottom side 30 and a plurality of side panels 32 extending between the top and bottom sides. The cable storage recess 20 is integrally formed in the housing 26 and an opening 34 in the housing's bottom side 30 provides access to the cable storage recess. In another embodiment, the cable storage recess 20 has the opening 46 in a side panel of the housing, rather than in the bottom. In the illustrated embodiment, the housing 26 is a strong and durable plastic component, although metals, other plastics, or other materials can be used to form the housing.

The cable storage recess 20 is shaped and sized so its length is substantially shorter than the internal portion of the cable 18 coiled or wound and contained therein. In one embodiment, the cable storage recess 20 is sized to contain up to twenty feet of coiled ⅛-inch cable. Accordingly, a cable 18 of this length can provide a high degree of flexibility in terms of the locations where the keyboard assembly 16 can be mounted relative to the terminal 14.

The elongated cable 18 is connected to the housing 26 and the keypad 24 by an enlarged connector 35 on one end of the cable. The connector 36 is securely fastened to the housing within the cable storage recess 20 and partially extends through an aperture to the housing's top side to operatively connect to the keypad 24. The connector 35 in the illustrated embodiment is a conventional 10-pin modular connector, although other connectors can be used.

The keyboard assembly 16 of the illustrated embodiment has a cover plate 36 shaped and sized to removably attach to the housing's bottom side and cover the opening 34 of the cable storage recess 20. The cover plate 36 is attached to the housing 26 by a plurality of screws 38 that extend through apertures 39 in the cover plate 36 and threadably engage bosses 41 integrally connected to the housing 26. In the illustrated embodiment, the cover plate 36 is an aluminum plate, although other metals, plastics, or other materials can be used. In alternate embodiments, other fasteners or retention devices can be used to attach the cover plate 36 to the housing 26. In an alternate embodiment, the cover plate 36 is connected to the housing with a hinge, and a latch mechanism is provided to retain the cover plate in a closed position. In yet another embodiment, the cover plate 36 is integrally connected to the housing 26.

As best seen in FIG. 2, an elongated slot 40 is formed in the cover plate 36 to provide access into the cable storage recess 20. The elongated slot 40 has a long narrow section 42 and an enlarged end portion 44 shaped and sized to allow the cable 18 to extend while retaining the interior portion 48 of the cable in the cable storage recess 20. The exterior portion 48 of the cable extends from the cable storage recess 20 through the elongated slot 40, and to the terminal 14.

The slot's narrow section 42 is too small for the cable's connector 35 to fit through it, but it is large enough to allow the cable to extend through it and be positioned at any location along that section. The slot's narrow section 42 also allows the cable 18 to be fed into or out of the cable storage recess 20 so as to adjust the length of the cable's exterior portion 40 during positioning or mounting of the keyboard assembly 16 relative the terminal 14. Thus, if the required length of cable's exterior portion 40 changes, such as when the mounting location of the keyboard assembly 16 on a vehicle changes, the length of the cable's exterior portion can be adjusted by feeding the cable 18 further into the cable storage recess 20 or by pulling additional cable out of the cable storage recess.

The slot's enlarged portion 44 is shaped and sized to allow the cable's connector 35 to fit therethrough. This allows the cable 18 and connector 35 to be easily and quickly threaded through the elongated slot 42 and connected to the housing 26 during installation or assembly. The slot's enlarged portion 44 is also shaped and sized to allow a connector on the other end of the cable 18 to fit therethrough so the entire cable with its connectors can be stored in the cable storage recess 20. Accordingly, the volume of the keyboard assembly with the cable 18 is minimized to facilitate storage and shipping of the assembly.

The keyboard assembly 16 is adapted to be mounted so the housing's bottom side 30 can be flat against a mounting surface on the vehicle or other support structure. As best seen in FIG. 2, a notch 52 is provided in one of the housing's side panels 32 adjacent to the bottom side 30. The notch 52 communicates with the cable storage recess 20 and is shaped and sized to allow a portion of the cable 18 to extend therethrough when the housing's bottom side is flat against the mounting surface. The cable 18 can be drawn from or fed into the cable storage recess 20 by moving it axially through the notch 52 when more or less cable is needed outside of the housing 26.

Figure 3:
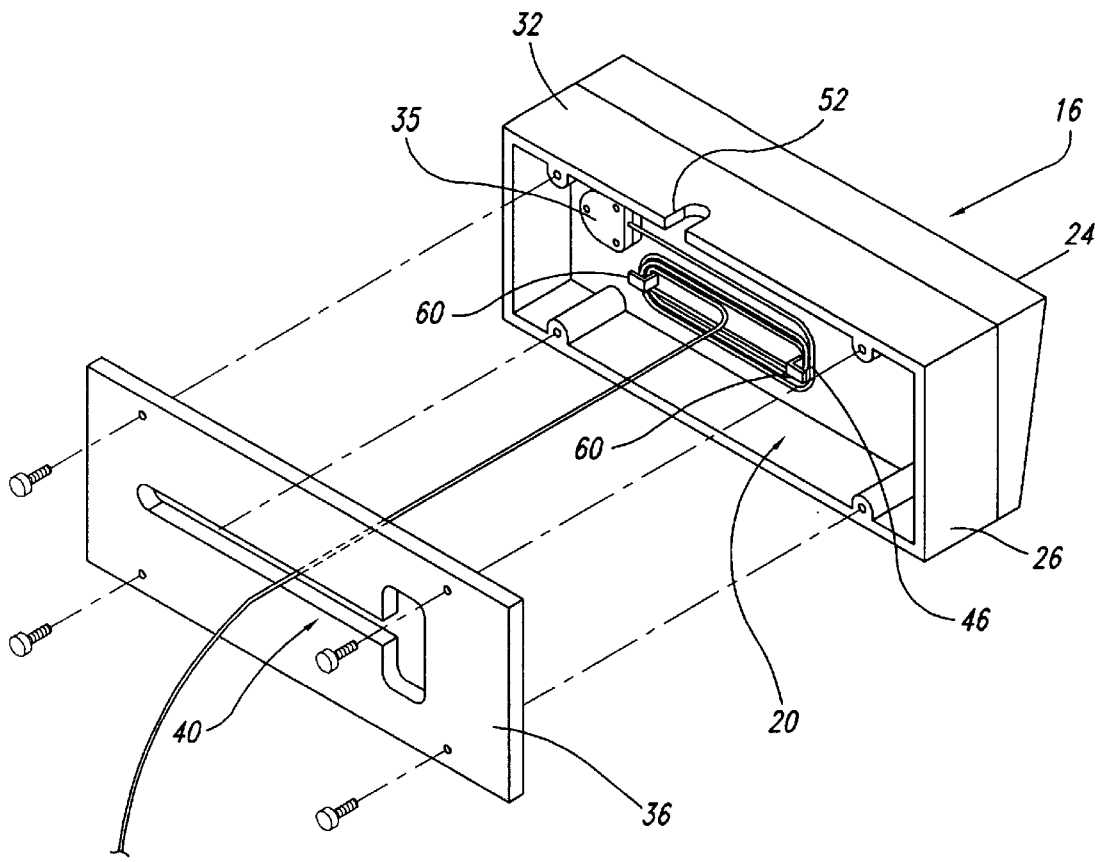
FIG. 3 is an exploded bottom isometric view showing a keyboard assembly with a cable storage recess having spaced apart retaining members in accordance with an alternate embodiment of the present invention.

The keyboard assembly 16 illustrated in FIG. 2 receives the cable's interior portion 46 within the cable storage recess 20 in a generally loosely coiled condition. In an alternate embodiment illustrated in FIG. 3, the keyboard assembly 16 includes a pair of spaced apart projections 60 attached to the housing 26 and that project into the cable storage recess 20. The projections 60 have a generally L-shaped cross-section and are positioned to face away from each other in an orientation that allows the cable's interior portion 46 to be wound around the projections and securely retained within the cable storage recess 20. In the illustrated embodiment, the L-shaped projections 60 are integrally connected to the housing 26. In alternate embodiments, the L-shaped projections 60 can be releasably connected or fastened to the housing in a variety of positions and orientations in order to accommodate the necessary length of cable 18 to be stored within the cable storage recess 20.

The keyboard assembly 16 with the projections 60 can also include the cover plate 36 removably fastened to the housing, for example, when the location of the keyboard assembly 16 is likely to not change once mounted. The L-shaped projections 60, however, are shaped and sized to sufficiently retain the cable's interior portion 46 within the cable storage recess 20 so the cover plate 36 may not be needed.

Figure 4:
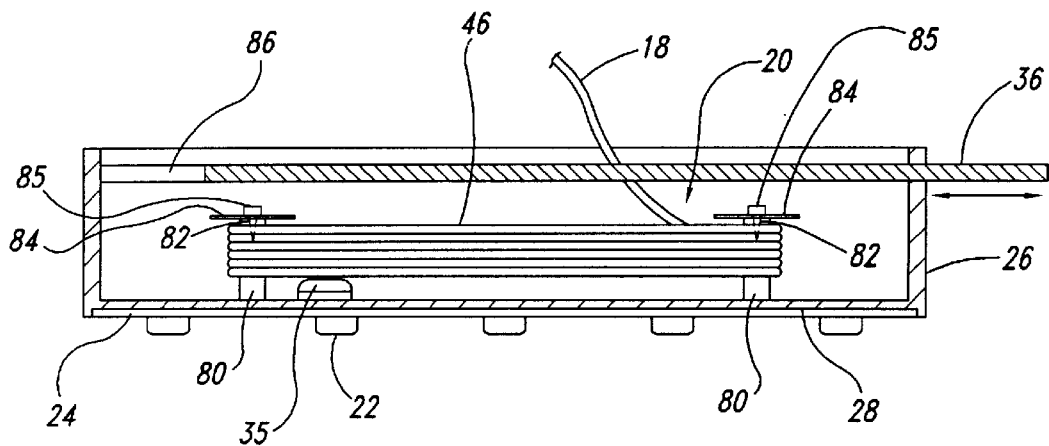
FIG. 4 is a cross-sectional view of an alternate embodiment having a pair of spaced apart cable retaining pins in the cable storage recess, and a slideable cover plate is shown on the keyboard housing in a partially open position.

As best seen in FIG. 4, an alternate embodiment of the present invention includes the keyboard's housing 26 with a pair of spaced-apart posts 80 that extend into the cable storage recess 20. Each post 80 has a free end 82 and an enlarged retaining member 84 attached to the free end. The enlarged retaining member 84 in the illustrated embodiment is a washer securely retained on the post's free end 82 by a conventional fastener 85. In alternate embodiments, the enlarged retaining member 84 is integrally connected to the post 80, or is adhered or otherwise securely attached to the post's free end 82 in a conventional manner. The posts 80 and the enlarged retaining members 84 are sized and spaced apart so as to allow the cable 18 to be wound therearound multiple times to securely retain a selective length of the cable's interior portion 46 within the cable recess 20, while allowing the minimum amount of cable 18 necessary to extend from the housing 26 to the terminal (not shown).

In one embodiment, the cable 18 is securely wound around the posts 80 and retained in place so a cover plate 36 is not needed. In an alternate embodiment, the cover plate 36 is removably attached to the housing 26 to removably cover the opening of the cable storage recess 20. In the embodiment illustrated in FIG. 4, the cover plate 36 is slideably positioned on the housing within slots 86 formed in the housing's side panels 32. The cover plate 36 is shown in FIG. 4 in a partially open position. The cover plate 36 is movable between a fully closed position to enclose the cable's interior portion 46 within the cable storage recess 20, or a fully opened position to provide full access into the cable storage recess.

Although specific embodiments of and examples for the present invention are described herein for illustrative purposes, various equivalent modifications can be made without departing from the spirit and scope of the invention, as will be recognized by those skilled in the relevant art. The teaching provided herein of the present invention can be applied to terminals and keyboards, not necessarily the exemplary vehicle mounted terminal and keyboard assembly generally described above.

These and other changes can be made to the invention in light of the above-detailed description. In general, in the following claims, the terms used should not be construed to limit the invention to the specific embodiments disclosed in the specification and the claims, but should be construed to include all terminals and keyboard assemblies that operate in accordance with the claims to provide such an assembly. Accordingly, the invention is not limited by the disclosure, but instead its scope is to be determined entire by the following claims.

What is claimed is:

1. A keyboard assembly coupleable to a terminal, comprising:

an elongated keyboard cable having first and second cable portions, the first cable portion being coupleable to the terminal;

a keyboard housing connected to the second cable portion, the housing having a cable-storage recess therein sized to receive and retain the second cable portion therein, the housing having an enlarged opening in one side of the housing and in communication with the recess, the recess having a first length and the second cable portion having a second length greater than the first length, the keyboard cable positionable with the first cable portion extending between the recess and the terminal; and a cover plate attached to the one side of the housing over the enlarged opening substantially covering the recess, the cover plate being positioned to removably retain the second cable portion in the recess, the cover plate having an elongated slot therein in communication with the opening and sized to allow the first cable portion to extend therethrough.

2. The keyboard assembly of claim 1 wherein the keyboard cable has a connector on the second cable portion connected to the housing, the slot having an enlarged portion sized to allow the connector to pass therethrough to allow the keyboard cable to extend through the slot.

3. The keyboard assembly of claim 1 wherein the keyboard cable has a connector thereon, the slot having an enlarged portion sized to allow the connector to pass therethrough.

4. The keyboard assembly of claim 1 wherein the keyboard housing has a second opening therein that communicates with the recess and is sized to allow the keyboard cable to extend therethrough when the cover plate is attached to the housing.

5. The keyboard assembly of claim 1 wherein the housing is mountable to the terminal.

6. The keyboard assembly of claim 1 wherein the keyboard assembly has a plurality of input devices coupled to the keyboard cable for communication to the terminal.

7. The keyboard assembly of claim 1 wherein the housing has a top side, a bottom side, and side panels extending therebetween, and the opening is in the bottom side of the housing.

8. The keyboard assembly of claim 1, further comprising a pair of spaced apart posts within the recess, the posts having enlarged retaining members thereon and positioned away from the housing, the post are sized to allow the second cable portion to be wound therearound, and the enlarged retaining members being positioned to retain the second cable portion on the posts.

9. The keyboard assembly of claim 1, further including a plurality of fasteners removably attaching the cover plate to the housing.

10. The keyboard assembly of claim 1 wherein the housing has a guideway therein adjacent to the recess, and the cover is positionable in the guideway and slideable relative to the housing between a closed position covering the recess and an open position providing access to the recess.

11. A keyboard assembly coupleable to a terminal, comprising:

an elongated keyboard cable having first and second cable portions, the first cable portion being coupleable to the terminal;

a keyboard housing having a cable-storage recess therein sized to removably receive and retain the second cable portion therein, the recess having a first length and the second cable portion having a second length greater than the first length, the keyboard cable being positionable with the first cable portion extending between the recess and the terminal; and a cable retaining member connected to the housing and positioned to removably retain the second cable portion in the recess, the cable retaining member being removably connected to the housing and having an elongated slot therein sized to allow the first cable portion to extend therethrough.

12. The keyboard assembly of claim 11 wherein the second cable portion has a connector thereon, the slot having an enlarged portion sized to allow the keyboard cable to extend therethrough.

13. The keyboard assembly of claim 11 wherein the housing has an opening therein that communicates with the recess and is sized to allow the keyboard cable to extend therethrough.

14. The keyboard assembly of claim 11 wherein the housing is mountable to a vehicle remote from the terminal with the first cable portion extending from the terminal into the recess in the housing.

15. The keyboard assembly of claim 11 wherein a bottom side of the housing has a recess opening therein that communicates with the recess and the cable retaining member is attached to the bottom side of the housing.

16. The keyboard assembly of claim 11 wherein the cable retaining member includes a pair of spaced apart projections within the recess, the projections are sized to allow the second cable portion to be wound therearound when stored in the recess.

17. The keyboard assembly of claim 11 wherein the cable retaining member includes a pair of spaced apart posts within the recess, the posts having enlarged retaining members thereon and positioned away from the housing, the post are sized to allow the second cable portion to be wound therearound, and the enlarged retaining members being positioned to retain the second cable portion on the posts.

18. A vehicle mounted terminal and keyboard assembly for use on a vehicle, comprising:

a terminal mounted to the vehicle;

an elongated keyboard cable having first and second cable portions, the first cable portion connected to the terminal; and a keyboard assembly mounted to the vehicle and connected to the second cable portion, the keyboard assembly having a keyboard housing with a cable-storage recess therein sized to removably receive and retain the second cable portion therein, the recess having a first length and the second cable portion having a second length longer than the first length, the keyboard cable being positioned with the first cable portion extending from the recess toward the terminal, and a cable retaining member connected to the keyboard housing and positioned to retain the first portion of the keyboard cable in the recess the cable retaining member having an elongated slot therein sized to allow the first cable portion to extend therethrough.

19. The assembly of claim 18 wherein the cable retaining member is removably connected to the housing.

20. The assembly of claim 18 wherein the keyboard cable has a connector thereon, the slot having an enlarged portion sized to allow the connector to pass therethrough.

21. The assembly of claim 18, wherein the housing has an opening therein that communicates with the recess and is sized to allow the keyboard cable to extend therethrough.

22. The assembly of claim 18 wherein the housing is mounted to the vehicle remote from the terminal with the first cable portion extending from the terminal into the recess in the housing.

23. The assembly of claim 18 wherein the first cable portion extending between the terminal and the housing is securely affixed to the vehicle.

24. The assembly of claim 18 wherein a bottom side of the housing has a recess opening therein that communicates with the recess, and the cable retaining member is adjacent to the bottom side of the housing.

25. The assembly of claim 18 wherein the cable retaining member includes a pair of spaced apart projections within the recess, the projections are sized to allow the second cable portion to be wound therearound when stored in the recess.

26. The assembly of claim 18 wherein the cable retaining member includes a pair of spaced apart posts within the recess, the posts having enlarged retaining members thereon and positioned away from the housing, the post are sized to allow the second cable portion to be wound therearound, and the enlarged retaining members being positioned to retain the second cable portion on the posts.

* * * * *